United States Patent [19]

Johnson et al.

[11] 3,748,586

[45] July 24, 1973

[54] FREQUENCY DISCRIMINATOR UTILIZING MECHANICAL FILTER

[75] Inventors: Robert A. Johnson, Tustin; Theodore M. Stump, Costa Mesa, both of Calif.

[73] Assignee: Collins Radio Company, Dallas, Tex.

[22] Filed: May 2, 1972

[21] Appl. No.: 249,580

[52] U.S. Cl. .................. 329/104, 307/233, 328/140, 329/145, 329/137, 333/71

[51] Int. Cl. .............................................. H03d 3/02

[58] Field of Search .................... 329/103, 110, 137, 329/104, 145; 328/140; 307/232, 233; 178/66 R; 313/71; 325/320

[56] References Cited

UNITED STATES PATENTS

| | | | |
|---|---|---|---|
| 3,440,574 | 4/1969 | Johnson et al. | 333/71 |
| 3,376,522 | 4/1968 | Traub | 333/71 |
| 3,571,712 | 3/1971 | Hellwarth et al. | 329/104 UX |
| 3,022,461 | 2/1962 | Wilcox | 329/145 X |

*Primary Examiner*—Alfred L. Brody
*Attorney*—Henry K. Woodward et al.

[57] ABSTRACT

A frequency discriminator utilizing a frequency sensitive phase shifting means, a two input gate, means for applying an fm signal to the phase shifting means and to a gate input, means applying the output of the phase shifting means to a gate input, the gate producing an output signal dependent on coincidence of the input signals. The phase responsive means may comprise a mechanical filter having symmetrical and essentially linear phase versus frequency response.

3 Claims, 3 Drawing Figures

FREQUENCY DISCRIMINATOR UTILIZING MECHANICAL FILTER

This invention relates generally to the electronic arts, and more particularly to frequency discriminators.

The use of frequency discriminators for demodulating frequency modulated (fm) electrical signals is well known in the broadcast and data transmission arts. In transmitting data, for example, "mark" and "space" data may be represented and transmitted as two separate frequencies which are received and detected by a discriminator in the reception means.

Heretofore, the discrimination has been accomplished in one of several ways. Digital means may be employed for counting the frequency and comparing the count with a standard reference. Another method utilizes a phase locked loop wherein the received signal is compared with a reference frequency and an error voltage is developed which is proportional to the frequency difference. Further, two separate tuned circuits utilizing electromechanical resonator filters may be utilized to separate the frequencies.

These known methods of discriminating between frequencies require standard references and/or entail relatively complicated and expensive circuitry.

The present invention is a novel and relatively simple frequency discriminator including a frequency responsive phase shifting means. The incoming frequencies are applied to the phase shifting means thereby shifting the phase of said frequencies an amount dependent on frequency. The phase shifted signal along with the incoming signal is applied to gate means whereby an output voltage generated by said gate means has a magnitude which is a function of frequency.

A feature of the invention is the use of an electromechanical filter with a linear phase response (for example a Bessel response) over the operating frequency range as the frequency responsive phase shift means. For data transmission to the output voltage may be applied to comparator means along with a reference voltage thereby obtaining RCV (Receive) data.

These and other objects and features of the invention will be more fully understood from the following detailed description and appended claims when taken with the drawings, in which:

Figure 1:
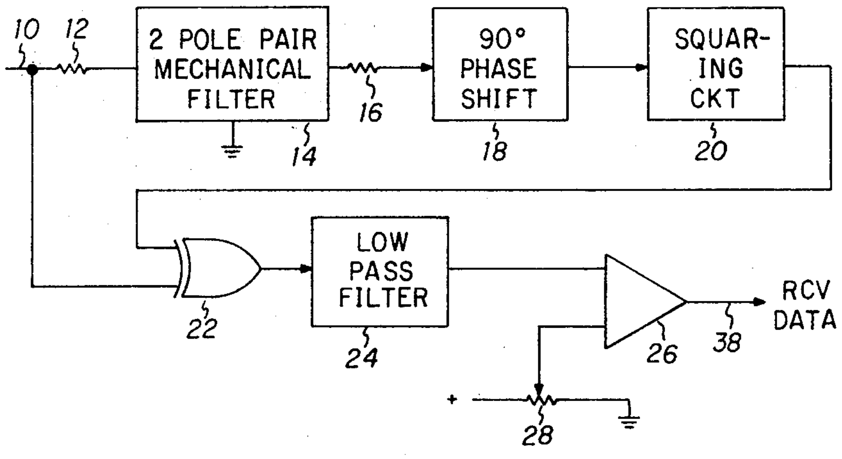
FIG. 1 is a functional block diagram of a frequency discriminator in accordance with the present invention.

Referring now to the drawings, FIG. 1 is a functional block diagram of a frequency discriminator in accordance with the present invention useful with the reception of transmitted data represented by "mark" and "space" signals. In an illustrative embodiment, the "mark" and "space" signals are transmitted in a frequency channel centered at 10,000 Hz, with the "mark" transmitted at 9,957.5 Hz and the "space" transmitted at 10,042.5 Hz. In receiving the transmitted intelligence it is mandatory to discriminate between these two closely spaced frequencies.

The input signal is applied at terminal 10 through resistor 12 to a two-pole pair electromechanical filter 14. Filter 14 is a conventional two-resonator mechanical structure with a center-frequency corresponding to the center frequency of the data transmission channel, 10,000 Hz in this embodiment with a useable bandwidth of 160 Hz (180° phase shift). As recognized in the art, mechanical filters can be designed to have a symmetrical and essentially linear phase versus frequency response over the passband of the filter. For example, for a "mark" signal at 9,957.5 Hz the phase shift imparted by filter 14 is approximately −40°, while for the "space" signal at 10,042.5 Hz the phase shift is approximately +40°.

The "mark" and "space" frequency signals transmitted by filter 14 are passed through resistor 16 to a 90° phase shifter 18. Phase shifter 18 may be a conventional inductor-capacitor circuit or a standard integrating amplifier. Thus, since the signal at the output of filter 14 either leads or lags the input signal thereto by 40°, depending on whether a "mark" or "space", the signal output from phase shifter 18 will lead the signal input to the filter by +50° or +130°, respectively.

The signal from phase shifter 18 is passed through squaring circuit 20 and then applied to one input of exclusive OR gate 22. The other input to exclusive OR gate 22 is provided by the input signal from terminal 10. As will be described further below, the voltage output from gate 22 is a pulsed signal with high duty cycle for the lower frequency and a low duty cycle or narrow pulse for the higher frequency. The pulse signal output from gate 22 is passed through low pass filter 24 which provides an integrating function thereby presenting a fluctuating DC voltage to comparator 26 where the voltage is compared against a reference voltage taken from potentiometer 28, with comparator 26 providing the RCV output at terminal 38.

Figure 2:
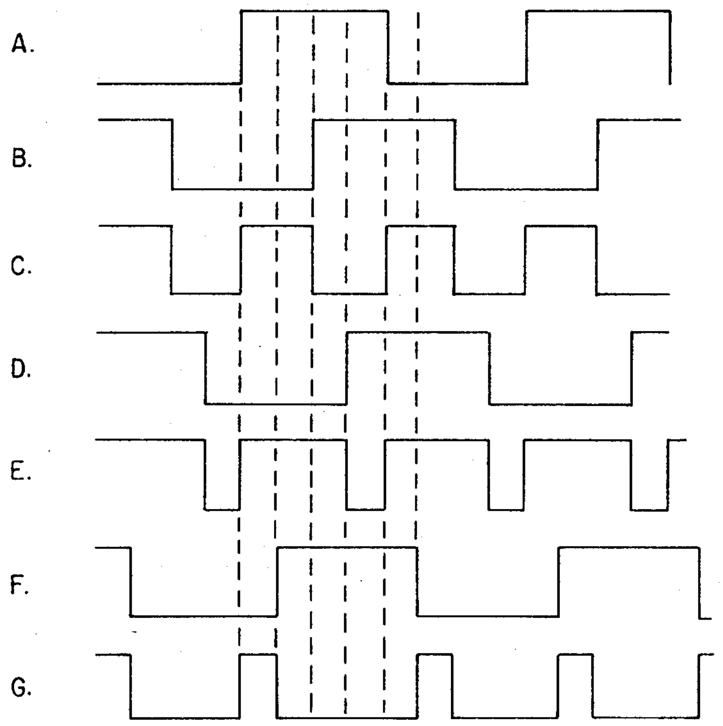
FIG. 2 is waveforms of voltages within the frequency discriminator of FIG. 1 useful in describing the operation thereof.

Consider now the voltage waveforms of FIG. 2 which represent voltages within the discriminator of FIG. 1 for "mark" and "space" signals. Waveform A is an input signal at terminal 10 of the discriminator of FIG. 1 and has a frequency within the transmission channel received by the discriminator. Assuming that the signal is at the center frequency of the transmission channel, the waveform in FIG. B is the output voltage produced by phase shifter 14 after passing through phase shifter 18 and squaring circuit 20, and has a 90° phase lag relative to the waveform of FIG. A. That is, mechanical filter 14 produces no phase effect on the input signal at the center frequency and the phase lag is attributable only to the 90° phase shift 18. With the waveforms shown in A and B provided as inputs to exclusive OR gate circuit 22, the voltage output of gate 22 after passing through low pass filter 24 has a 50% duty cycle as illustrated by waveform C.

Assume now that the input signal shown in A is a "mark" signal below the center frequency. Frequency sensitive mechanical filter 14 then produces a phase lag of about 40° at the "mark" frequency. The 40° lag plus the 90° phase shift produced by phase shifter 18 causes the voltage output of squaring circuit 20 to lag the input circuit by approximately 130° as illustrated by the waveform of FIG. D. Thus, when this voltage and the input signal of FIG. A are applied to exclusive OR gate 22 the output is a voltage with high duty cycle as illustrated by waveform E.

Conversely, if the input signal is a "space" signal at a frequency above the center frequency, frequency responsive phase shifter 14 produces a 40° leading phase effect on the input signal which counteracts the 90° phase shift of phase shifter 18. Thus, the voltage at the output of squaring circuit 20 will lag the input signal by only approximately 50 electrical degrees as illustrated by waveform F. Applying waveform F and the input signal waveform A to exclusive OR gate 22 produces the output signal with a low duty cycle as illustrated by waveform G.

Thus, a comparison of the output voltage from low pass filter 24 by comparator 26 with respect to a reference voltage 28 gives the RCV data 38 at the output of comparator 26. For example, when the input signal at terminal 10 is at the center frequency the signal from low pass filter 24, waveform G, applied to comparator 26 gives a 0 volt output. When the input signal to terminal 10 is below the center frequency corresponding to a "mark" input, the voltage from low pass filter 24, waveform E, produces a positive output from comparator 26; and when the input signal is above the center frequency the voltage from low pass filter 24, waveform G, results in a negative voltage output from comparator 26.

Figure 3:
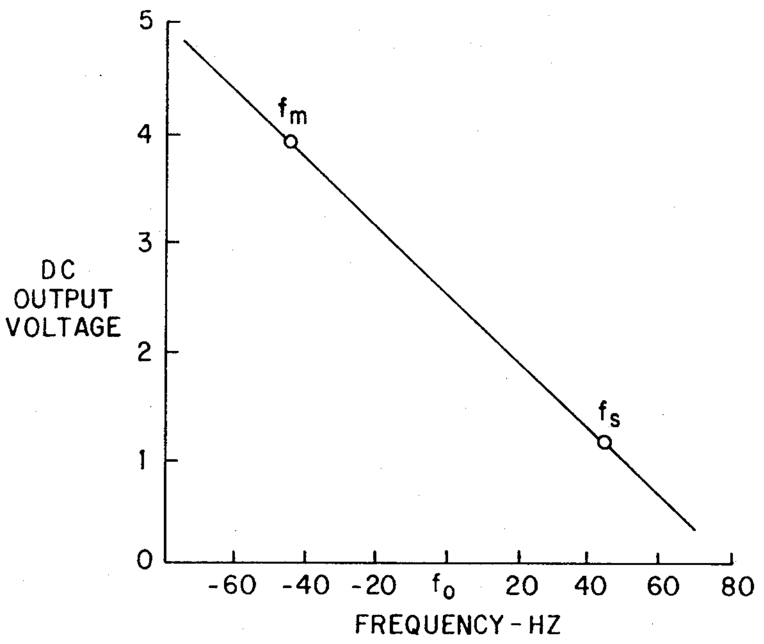
FIG. 3 is a plot of voltage output versus frequency for the discriminator of FIG. 1.

FIG. 3 illustrates the excellent linearity of the two pole pair mechanical filter used as a phase discriminator in the illustrative embodiment. The DC output voltage from low pass filter 24 is plotted along the ordinate against the channel frequency plotted along the abscissa with the center frequency being 10,000 Hz. It is noted that the output voltage is linear versus frequency and that at the "mark" frequency an output voltage of approximately 3.9 volts is obtained at the output of filter 24, whereas at the "space" frequency $F_S$ a voltage of approximately 1.2 volts is obtained. Thus, while the illustrative embodiment has been described in a data communication application, the discriminator has applicability as a voice frequency discriminator also, due to the linear voltage versus frequency response of a two resonator mechanical filter.

The described frequency discriminator is economical to implement and has proved very reliable in operation. While the invention has been described with reference to a specific embodiment, the description is illustrative and is not to be construed as limiting the invention. Various modifications and changes may occur to those skilled in the art without departing from the spirit and scope of the invention as defined by the appended claims.

We claim:

1. A frequency discriminator comprising a linear frequency responsive phase shifting means including electromechanical filter means, gate means including an exclusive OR gate and a low pass filter serially connected, means for applying a frequency modulated signal to said phase shifting means and to an input of said gate means, means for applying the output of said phase shifting means to an input of said gate means, said gate means producing an output signal dependent on coincidence of said input signals, and comparator means for comparing the output of said low pass filter and a reference voltage.

2. A frequency discriminator as defined by claim 1 wherein said phase responsive means comprises an electromechanical filter and a fixed phase shift means serially connected.

3. A frequency discriminator comprising a linear frequency responsive phase shifting electromechanical filter, a 90° phase shift means and a squaring circuit means serially connected; an exclusive OR gate, means for providing a frequency modulated signal to said electromechanical filter and to an input to said gate, means connecting the output of said squaring circuit to another input to said gate, a low pass filter connected to the output of said gate, and comparator means for comparing the output voltage of said low pass filter and a reference voltage.

* * * * *